United States Patent Office 3,285,919
Patented Nov. 15, 1966

3,285,919
PIPERAZINYL ALKYL THIAXANTHENE
DERIVATIVES
John Andrew Faust and Melville Sahyun, Santa Barbara, Calif.; said Faust assignor to Melville Sahyun, doing business as Sahyun Laboratories, Santa Barbara, Calif., a corporation of California
No Drawing. Filed May 10, 1961, Ser. No. 108,983
12 Claims. (Cl. 260—268)

This invention relates to compositions of matter classified in the art of organic chemistry as substituted thiaxanthenes and, more particularly, to derivatives of N'-alkyl-piperazinyl-N-alkyl-thiaxanthenes.

This application is a continuation-in-part of our abandoned applications, Serial No. 738,647 filed May 29, 1958 entitled, "Thiaxanthene Derivatives," and Serial No 819,803 filed June 12, 1959 entitled, "Substituted Thiaxanthene Derivatives."

The invention sought to be patented is described as residing in the concept of a chemical compound having a molecular structure in which there is attached, to a 9-(N'-lower-alkyl-piperazinyl-N-polycarbon lower-alkyl)-thiaxanthene nucleus unsubstituted in other than the 2-position of the thiaxanthene ring system, at least one oxy radical to a carbon atom of the N'-lower-alkyl moiety of said nucleus.

The tangible embodiments of the invention in free base form are generally oily liquids and, when in the form of the di-acid addition salts, generally possess the inherent physical properties of being high melting, water-soluble, white, crystalline solids.

The tangible embodiments of the invention possess the inherent applied use characteristic of marked ataractic activity as demonstrated by pharmacological evaluation by standard test procedures, which indicates a high degree of utility as tranquilizers for use in the management of mental disorders. Because of their water solubility, the di-acid addition salts are the convenient form in which the tangible embodiments of the invention are employed in actual use and are the full equivalents of the free bases, being made therefrom in conventional manner.

As a further description of the invention sought to be patented: the thiaxanthene ring system is unsubstituted in other than the 2-position thereof, and may be unsubstituted in the 2-position. When there is a substituent present in the 2-position, the substituent can be any one of those now found on known substituted thiaxanthenes. However, based on the desired inherent use characteristics, a preferred group of substituents includes the following: a halogen, e.g., chloro, bromo, iodo, fluoro; a hydroxy radical; a lower-alkyl radical, e.g., methyl, ethyl, propyl, isopropyl, pentyl, etc.; a lower-alkoxy radical, e.g., methoxy, propoxy, pentoxy, etc.; or a trifluoromethyl radical. The N'-lower-alkyl portion of the 9-(N'-lower-alkyl-piperazinyl-N-lower-alkyl)-thiaxanthene will have one or two oxy radicals attached to it via the carbon atom or atoms of the N' moiety. The term "oxy radical," as used herein, means an oxygen-containing monovalent radical of the hydroxy, lower-alkoxy, hydroxy-lower-alkoxy, lower-alkanoyloxy and benzoyloxy type.

The free base compounds of the present invention have the structural formula:

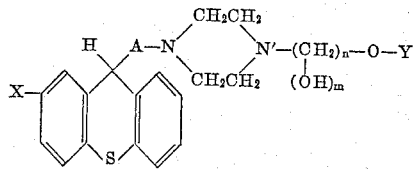

wherein

X represents a hydrogen atom, or a halogen atom, or a hydroxy, lower-alkyl, lower-alkoxy or trifluoromethyl radical; and
A represents an alkylene bridge having from 2 to 6 carbons arranged in straight or branched chains, e.g., ethylene, propylene, isopropylene, butylene, isobutylene, pentylene, hexylene; and
$n$ represents an integer from 2–4, i.e., 2, 3 or 4;
$m$ represents zero or one;
Y represents a hydrogen atom, or a lower-alkyl, hydroxy-lower-alkyl, or an acyl radical having the formula

wherein R represents a lower-alkyl or the phenyl radical.

The prefix "lower" as applied to "alkyl" or "alkanoyl" is intended to include those having not more than six carbon atoms in the chain.

When X in the above formula is a halogen, it is preferably chlorine, but it may also be bromine, iodine or fluorine.

When Y in the above formula is acyl, and R is phenyl, the term "phenyl" means the unsubstituted phenyl radical and such substituted phenyl radicals where in the benzene ring bears one or more simple substituents which do not adversely affect the pharmacological properties of the compound, such as a halogen atom, the methyl, methoxy, nitro, amino, trifluoromethyl, and other groups commonly used in the art as substituents on the benzene ring.

When $m$ in the above formula is one, then the (OH) group replaces one of the hydrogen atoms in the

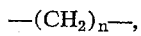

and the formula is intended so to indicate.

Based on their inherent use characteristics, the preferred compounds are those of the di-acid addition salts of the above structural formula wherein X is chlorine, A is a propylene chain and Y is hydrogen.

The manner and process of making and using the invention will now be generally described so as to enable a person skilled in the art of chemistry to make and use the same, as follows:

Those compounds of the present invention which are esters are made from the non-ester compounds of the present invention, so the general methods of preparation of the latter will be described first:

*Procedure (A).*—Those compounds wherein the thiaxanthene is unsubstituted (X is H) and the alkylene bridge (A) is straight chain, and which are not esters (Y is not acyl) are prepared as follows: By refluxing thiaxanthene with butyl lithium solution under a nitrogen atmosphere, thereby forming the lithium salt of thiaxanthene, wherein the lithium is substituted in the 9-position. This lithium salt is then reacted by refluxing an ether solution of alpha, omega-dibromo-lower-alkane (the lower alkane being that having the same number of carbons as the alkylene bridge of the desired final product) to form 9-(omega-bromo-lower-alkyl)thiaxanthene. This latter is reacted with 1-(substituted) piperazine (the substituent being that of the desired final product, e.g., 1-omega-hydroxy lower-alkyl piperazine where this is in the desired final product; it would of course be a di-hydroxy lower-alkyl piperazine where the final product is to contain two hydroxy groups) etc., by refluxing the reactants in a suitable solvent, such as toluene or alcohol, containing anhydrous potassium carbonate to form the desired free compound of the present invention, which may then be separated. The acid addition salt is then formed by treating the free base with an excess of the desired acid in ethereal solution, in the well-known manner.

*Procedure (B).*—Those compounds wherein the thiaxanthene is unsubstituted (X is H), which are not esters (Y is not acyl) but where the alkylene bridge (A) is branched chain are prepared as follows: Thiaxanthene is reacted with butyl lithium to form the lithium salt of the starting thiaxanthene, as above. This lithium salt is then reacted with an ether solution of a lower-alkenyl halide, e.g., allyl bromide, 4-bromo-1-butene, 5-bromo-1-pentene, 6-bromo-1-hexene (the lower-alkenyl halide to be used is that having the same number of carbons as in the alkylene bridge of the desired end product) to form the corresponding 9-lower-alkenylthiaxanthene (the unsaturation will be omega to the thiaxanthene). HI is then added to the unsaturated compound by the use of potassium iodide, orthophosphoric acid and phosphoric anhydride, the addition proceeding normally so that the iso-iodide compound is formed.

This latter is reacted with 1-(substituted)piperazine, as in the general procedure above, to form the desired free base, from which any of the acid salts may be made.

*Procedure (C).*—Those compounds wherein the thiaxanthene is substituted (X is not H), which are not esters (Y is not acyl), and where the alkylene bridge (A) is straight chain are prepared as follows: A 2-substituted-thiaxanthene, where the substituent is that of the 2-position of the thiaxanthene of the desired end product, is prepared in known fashion. Procedure (A) above is then followed, with 2-substituted-thiaxanthene replacing the unsubstituted thiaxanthene.

*Procedure (D).*—Those compounds wherein the thiaxanthene is substituted (X is not H), which are not esters (Y is not acyl) but where the alkylene bridge (A) is branched chain are prepared as follows: A 2-substituted-thiaxanthene, where the substituent is that of the 2-position of the thiaxanthene of the desired end product, is prepared in known fashion. Procedure (B) above is then followed with the 2-substituted-thiaxanthene replacing the unsubstituted thiaxanthene.

*Procedure (E).*—Those compounds which are esters, i.e., wherein Y is acyl, are prepared as follows: By acylation of the corresponding hydroxy compound, i.e., by following the above procedures to form the compound wherein Y is hydrogen and reacting this with an acid chloride of the formula YCl wherein Y is the same acyl group as in the desired end product ester. The acylation reaction is preferably accomplished in the presence of a solvent inert under the reaction conditions, e.g., an aromatic hydrocarbon such as benzene, toluene, xylene; an ether such as diethylether or tetrahydrofuran; a chlorinated hydrocarbon such as chloroform; and also in the presence of an anhydrous inorganic base, e.g., alkali metal hydroxides and carbonates. After the initial exothermic portion of the reaction has terminated, the reaction mixture is heated at reflux for several hours to complete the acylation. The reaction mixture is cooled and decomposed with ice water. The ester product in free base form is recovered therefrom by extraction with a solvent, e.g., ether, and then by evaporating the extraction solvent solution. If desired the hydrochloride acid addition salt can be prepared by passing anhydrous hydrogen chloride into the dried solution of the free base. The acid addition salt precipitates from solution and can be further purified by recrystallization. Treatment of the acid addition salt with an aqueous inorganic salt liberates the free base form.

It will be apparent to those skilled in the art of chemistry that the free base compounds of the present invention can be converted to any desired acid addition salt form, and that any acid addition salt can be converted to any other one. When the tangible embodiments of the invention are employed for pharmacological uses, they ordinarily will be in the form of the non-toxic acid addition salts.

The acids which can be used to prepare the acid addition salts are preferably those which produce, when combined with the free base, salts whose anions are relatively innocuous to the animal organism in therapeutic doses of the salts, so that beneficial physiological properties inherent in the free base are not vitiated by side effects ascribable to the anions.

Appropriate non-toxic acid addition salts are those derived from mineral acids such as hydrochloric acid, hydrobromic acid, hydriodic acid, nitric acid, phosphoric acid and sulfuric acid; and organic salts such as acetic acid, citric acid, tartaric acid, lactic acid, and the like, giving the hydrochloride, hydrobromide, hydroiodide, nitrate, phosphate or acid phosphate, sulfate or bisulfate, acetate, citrate or acid citrate, tartrate or bitartrate, and lactate salts, respectively.

The following preparations and examples are illustrative of the compounds of the present invention, and of the processes by which they and their intermediates may be made but are not to be construed as limiting.

PREPARATIONS

*Preparation 1: 9-(3-bromopropyl) thiaxanthene*

To a solution of butyl lithium at −10 degrees centigrade, prepared from 1.5 grams (0.22 gram at.) of lithium as described in J. Am. Chem. Soc., 71, 1499 (1949), there was added 15 grams (0.075 mole) of powdered 9-thiaxanthene, and the mixture was refluxed for 3 hours under an atmosphere of dry nitrogen. The dark red mixture was then siphoned, in portions, by means of nitrogen pressure into a stirred solution of 60 grams (0.3 mole) of 1,3-dibromopropane in 300 milliliters of dry ether at room temperature. During the addition, which was over a period of 15 minutes, the deep red color of the organo-metallic solution was immediately discharged and a white precipitate formed. The mixture was stirred and refluxed for 1 hour and filtered to remove about 4 grams of solid, the identity of which was not established. The yellow filtrate was washed with water, then with dilute hydrochloric acid and dried over magnesium sulfate. Fractional distillation yielded 45 grams of unreacted 1,3-dibromopropane, boiling point 65 degrees (20 millimeters), 2.5 grams of unreacted thiaxanthene, boiling point 140–168 degrees centigrade (0.7 millimeter) and 11 grams of the desired product, 9-(3-bromopropyl) thiaxanthene, boiling point 178–182 degrees centigrade (0.7 millimeter).

*Preparation 2: 9-(5-bromopentyl) thiaxanthene*

Following the procedure of Preparation 1, but using 1,5-dibromopentane instead of 1,3-dibromopropane, there was obtained a 33 percent yield of 9-(5-bromopentyl) thiaxanthene, boiling at 190–195 degrees centigrade at a pressure of 0.6 millimeter.

*Preparation 3: 9-(2-chloro) thiaxanthenone*

A stirred mixture of 50 grams (0.32 mole) of commercial o-mercaptobenzoic acid, 200 milliliters of chlorobenzene and 500 milliliters of 96 percent sulfuric acid was stirred at approximately 70 degrees for 6 hours. After the mixture had remained overnight at 25 degrees centigrade, the layers were separated. Ice cubes were added to the sulfuric acid layer and the water formed was allowed to diffuse slowly into the sulfuric acid. The finely divided solid was collected on a filter, washed with water by trituration, and refiltered. The filter cake was digested in 300 milliliters of hot isopropyl alcohol, filtered, and the solid was recrystallized from hot dimethylformamide. Yield, 32 grams (41 percent), melting point 151–152 degrees centigrade.

*Analysis.*—Calculated for $C_{13}H_7ClOS$: C, 63.3; H, 2.86. Found: C, 66.7; H, 2.88.

As a structure proof, the compound was prepared by an alternate route: 5-chloroanthranilic acid, prepared by the chlorination of anthranilic acid, according to J. Am. Chem. Soc. 68, 1303 (1946) was converted into 5-chloro-2-mercaptobenzoic acid by the method described in J.

Org. Chem., 18, 1380 (1953), and the latter was condensed with benzene by means of sulfuric acid to yield 9-(2-chloro)-thiaxanthenone, identical with that obtained by the first method.

Preparation 4.—2-chlorothiaxanthene

A mixture of 45 grams (0.18 mole) of 9-(2-chloro) thiaxanthenone, 7.2 grams (0.028 mole) of iodine, 14.4 grams (0.46 gram atom) of red phosphorus, 15 milliliters of hydriodic acid (SP. Gr. 1.5) and 180 milliliters of glacial acetic acid was refluxed for 48 hours. The hot solution was filtered to remove the unreacted phosphorus and the filtrate was added slowly to 500 milliliters of water containing 6 grams of sodium bisulfite. The solid was collected on a filter, washed with water and dried. The crude product melting at 92–95 degrees centigrade and weighing 41 grams (96 percent) was recrystallized from 120 milliliters of ethanol to obtain 36 grams of product melting at 101–102 degrees centigrade. Subsequent recrystallization from ethanol raised the melting point to 102–103 degrees centigrade. It distills at 165–169 degrees centigrade (1.3 millimeters) without decomposition.

Analysis.—Calculated for $C_{13}H_9ClS$: C, 67.1; H, 3.90. Found: C, 66.3; H, 3.86.

The reduction may also be accomplished as follows: A stirred mixture of 20 grams (0.081 mole) of 9-(2-chloro)thiaxanthenone, 20 grams of red phosphorus and 125 milliliters of acetic anhydride was treated dropwise with 125 milliliters of hydriodic acid (D=1.5). The reaction was extremely exothermic, and after the addition, the mixture was stirred and refluxed for 6 hours. It was then cooled somewhat and poured into ice-water. The mixture was filtered and the filter cake was treated with boiling methanol and filtered hot. The pale yellow filtrate was concentrated, cooled, and the solid 2-chloro-thiaxanthene which separated was isolated and dried. Yield, 11 grams (59 percent), melting point 98–100 degrees centigrade. The melting point was raised to 102–103 degrees centigrade by subsequent recrystallization from ethanol.

This compound was also prepared by an alternate procedure: 9-(2-chloro)thiaxanthenone was reduced to 9-(2-chloro)thiaxanthenol with sodium amalgam in methanol according to the procedure described for 9-thiaxanthenone to 9-thiaxanthenol in J. Am. Chem. Soc., 72, 5332 (1950). The 9-(2-chloro)thiaxanthenol, so obtained, melted at 128–129 degrees centigrade and was disproportionated into a mixture of 9-(2-chloro)-thiaxanthenone and 2-chlorothiaxanthene by refluxing in glacial acetic acid for 2 hours. The mixture was separated by fractional crystallization from methanol in which the 2-chlorothiaxanthene is the more soluble.

Preparation 5.—2-chloro-9-(3-bromopropyl) thiaxanthene

To a solution of butyl lithium, prepared from 1.2 grams (0.17 gram at.) of lithium, 10 milliliters of butyl bromide and 200 milliliters of dry ether according to J. Am. Chem. Soc. 71, 1499 (1949), was added 8.1 grams (0.035 mole) of 2-chlorothiaxanthene and the mixture was stirred under reflux for 3 hours under an atmosphere of dry nitrogen. The dark red mixture was then siphoned, in portions, by means of nitrogen pressure into a stirred solution of 80 grams (0.4 mole) of 1,3-dibromopropane in 300 milliliters of dry ether. During the addition, which was over a period of 15 minutes, the deep red color of the organo-metallic solution was immediately discharged and a white precipitate formed. The mixture was stirred and refluxed for 1 hour, filtered, and the filtrate was washed with water, then with dilute hydrochloric acid and dried over magnesium sulfate. Fractional distillation yielded, in addition to the unreacted 1,3-dibromopropane, 4.7 grams (52 percent) of 2-chloro-9-(3-bromopropyl) thiaxanthene as a viscous oil, boiling point 190–204 degrees centigrade (0.7 millimeter). Upon redistillation it boiled at 188–190 degrees centigrade (0.5 millimeter). The oil slowly crystallized and melted at 102–103 degrees centigrade after recrystallization from ethanol.

Analysis.—Calculated for $C_{16}H_{14}BrClS$: C, 54.44; H, 3.99. Found: C, 54.60; H, 3.90.

By substituting 1-bromo-3-3chloropropane for 1,3-dibromopropane in the above preparation, 2-chloro-9-(3-chloropropyl) thiaxanthene was obtained in 58 percent yield. It is a viscous oil, boiling point 186–196 degrees centigrade (1.2 millimeters), which crystallizes and melts at 90–91 degrees centigrade after recrystallization from ethanol.

Preparation 6.—2-chloro-9-(4-chlorobutyl) thiaxanthene

To a solution of butyl lithium prepared from 1 gram of lithium according to J. Am. Chem. Soc., 71, 1499 (1949) was added 4.9 grams (0.021 mole) of 2-chlorothiaxanthene and the red mixture was refluxed for 3 hours. It was then reacted with 60 milliliters of 1,4-dichlorobutane in 100 milliliters of dry ether by the process described in the method of Preparation 3. There was obtained 3.7 grams (55 percent) of oily product 2-chloro-9-(4-chlorobutyl) thiaxanthene, boiling point 192–205 degrees centigrade (1 millimeter).

Preparation 7.—2-chloro-9-allylthiaxanthene

To an ether solution of butyl lithium at −10 degrees centigrade, prepared from 0.7 gram (0.1 mole) of lithium and 6.9 grams (0.05 mole) of butyl bromide, was added 8.5 grams (0.036 mole) of 2-chloro-thiaxanthene. The dark red mixture was stirred at 0 degrees centigrade for 0.5 hour, stirred and refluxed for 1 hour and cooled to room temperature. A solution of 5.5 grams (0.045 mole) of allyl bromide in 20 milliliters of ether was added during 15 minutes, after which the mixture was refluxed for 1 hour. Dilute hydrochloric acid was added, the layers were separated and the ether layer was distilled. Yield, 8.3 grams (85 percent) of 2-chloro-9-allylthiaxanthene, boiling point 150–152 degrees centigrade (0.5 millimeter).

Preparation 8.—2-chloro-9-(2-iodopropyl) thiaxanthene

Eight milliliters (0.12 mole) of 85 percent orthophosphoric acid was combined with 3.5 grams (0.025 mole) of phosphoric anhydride and to the cooled mixture was added 13.3 grams (0.08 mole) of potassium iodide and 8 grams (0.029 mole) of 2-chloro-9-allythiaxanthene. The mixture was stirred at 100–120 degrees centigrade for 3 hours, cooled and partitioned between water and ether. The ether solution was washed with dilute sodium thiosulfate, dried and concentrated to a viscous light brown oil weighing 6 grams. Since it appeared to decompose during an attempted distillation at 0.5 millimeter, the oil 2-chloro-9-(2-iodopropyl) thiaxanthene was not purified but used directly in the subsequent reaction as shown by the example.

Following the procedures of Preparations 7 and 8, but starting with unchlorinated thiaxanthene, 9-(2-iodopropyl) thiaxanthene can be prepared.

Following the procedure of Preparations 7 and 8, using 5-bromo-1-pentene in place of allyl bromide, 2-chloro-9-(4-iodopentyl) thiaxanthene can be prepared.

Following the procedure of Preparation 3, but using a halobenzene other than chlorobenzene, e.g., bromobenzene, iodobenzene, the desired 9-(2-halo) thiaxanthenone can be prepared, which is then used to prepare the other 2-halothiaxanthene compounds shown in the other preparations as will be obvious to those skilled in the art.

Preparation 9: 1-(2,3-dihydroxypropyl) piperazine

This known compound was prepared by the alkylation of N-benzyl-piperazine [J. Org. Chem., 12, 771 (1947)] with 3-chloro-1,2-propanediol and debenzylation of the resulting product by catalytic hydrogenation using the process described in J. Am. Chem. Soc., 76, 4992 (1954).

Preparation 10: 2-alkoxythiaxanthenone

These compounds are prepared by the condensation of o-mercaptobenzoic acid and a phenyl alkyl ether in sulfuric acid, e.g., with anisole there is obtained 2-methoxythiaxanthenone, and with phenetole there is obtained 2-ethoxythiaxanthenone. The latter was obtained in the form of canary yellow needles, which after recrystallization from isopropyl alcohol melted at 126-127 degrees centigrade.

*Analysis.*—Calculated for $C_{15}H_{12}O_2S$: C, 70.30; H, 4.72. Found: C, 70.36; H, 4.43.

Preparation 11: 2-alkoxythiaxanthene

These compounds are prepared by the sodium-alcohol reduction of the corresponding 2-alkoxythiaxanthenone.

2-methoxythiaxanthene, which was obtained in 59 percent yield, melted at 134-135 degrees centigrade after recrystallization from isopropyl alcohol.

*Analysis.*—Calculated for $C_{14}H_{12}OS$: C, 73.68; H, 5.30. Found C, 73.30; H, 5.38.

2-ethoxythiaxanthene, which was obtained in 56 percent yield, melted at 72-73 degrees centigrade after recrystallization from isopropyl alcohol.

*Analysis.*—Calculated for $C_{15}H_{14}OS$: C, 74.36; H, 5.38. Found: C, 73.52; H, 5.81.

Preparation 12: 9-(3-bromopropyl)-2-alkoxythiaxanthene

The compounds are prepared by following the procedure described in Preparation 5, whereby the lithium derivative of 2-alkoxythiaxanthene is prepared and reacted with an excess of 1,3-dibromopropane.

9-(3-bromopropyl)-2-methoxythiaxanthene was obtained in 58 percent yield as a viscous oil, which boiled at 200-209 degrees centigrade at a pressure of 0.8 millimeter.

9-(3-bromopropyl)-2-ethoxythiaxanthene was obtained in 50 percent yield as a viscous reddish-brown oil, which boiled at 188-195 degrees centigrade at a pressure of 0.4 millimeter.

Preparation 13: 9-(3-bromopropyl) 2-hydrothiaxanthene

Phosphorus pentoxide (3.5 grams, 0.025 mole) was added to 8 milliliters (0.12 mole) of 85 percent phosphoric acid and the mixture was cooled to about 25 degrees centigrade. To this mixture was added 13.3 grams (0.08 mole) of potassium iodide and 8 grams (0.923 mole) of 9-(3-bromopropyl) - 2-methoxythiaxanthene. The mixture was stirred at 70-80 degrees centigrade until the foaming subsided (1 hour), after which the temperature was raised to 110 degrees and maintained for an additional hour. Water and chloroform were added to the cooled reaction mixture and the resulting mixture was filtered to remove the insoluble material. The layers of the filtrate were separated, and the chloroform solution was washed with dilute sodium thiosulfate, dried and distilled to remove the solvent. The residue was a brown, taffy-like substance weighing 5 grams which was used directly in the next step (in the corresponding example).

Preparation 14: N-(2-methoxyethyl) piperazine

This compound was obtained in 51 percent yield by the alkylation of piperazine with 2-methoxyethyl chloride (J.A.C.S., 52, 653 (1930)). The base is a colorless liquid boiling point 105-110 degrees centigrade (20 millimeters), the dihydrochloride of which melts at 208-210 degrees centigrade (dec.) after recrystallization from methanol-ether.

*Analysis.*—Calculated for $C_7H_{16}N_2O.2HCl$: N, 12.91; Cl⁻, 32.65. Found: N, 12.74; Cl⁻, 32.04.

Preparation 15: N-(2-hydroxyethoxyethyl) piperazine

This compound was obtained in 70 percent yield by the alkylation of piperazine with 2-(2'-chloroethoxy) ethanol. It is a colorless oil, boiling point 128-130 degrees (0.5 millimeter).

*Analysis.*—Calculated for $C_8H_{18}N_2O_2$: N, 16.08; Neut. Equivalent, 174. Found N, 16.09; Neut. Equivalent, 173.

The dihydrochloride is a white, hygroscopic solid, melting point 111-112 degrees after recrystallization from ethanol.

*Analysis.*—Calculated for $C_8H_{18}N_2O_2.HCl$: N, 11.34; Cl⁻, 28.69. Found: N, 11.29; Cl⁻, 28.75.

Preparation 16: 2-alkylthiaxanthene

These compounds are prepared by the sodium-alcohol reduction of the corresponding 2-alkylthiaxanthenone.

The thiaxanthenones are prepared as follows: Equimolar quantities of the sodium salts of p-alkylphenylthiol and o-chlorobenzoic acid were heated together for two hours at 200-220 degrees to form 2-(p-alkylphenylmercapto) benzoic acid, and then using sulfuric acid to effect ring closure.

2-methylthiaxanthene was prepared by refluxing a solution of 28 grams (0.12 mole) of 2-methylthiaxanthenone in 500 milliliters of ethanol, while adding thereto 35 grams of sodium during a 30 minute period; the mixture was distilled to remove some of the alcohol, and water was added to the residue. The solid which separated was isolated and recrystallized from isopropyl alcohol. Yield, 14.5 grams (55 percent), melting point 80-81 degrees.

Preparation 17: 9-(3-bromopropyl)-2-alkylthiaxanthene

These compounds are prepared by following the procedure of Preparation 5 whereby the lithium derivative of 2-alkylthiaxanthene is prepared and reacted with an excess of 1,3-dibromopropane.

9-(3-bromopropyl) thiazanthene was obtained in 49 percent yield as a viscous yellow oil which bolied at 182-188 degrees centigrade at a pressure of 0.4 millimeter.

Preparation 18: 9-(3-chloro-2-methylpropyl) 2-chlorothiaxanthene

The lithium derivative of 2-chlorothiaxanthene was prepared and reacted with an excess of 1-bromo-3-chloro-2-methyl propane in the manner described in Preparation 5. The product, obtained in 61 percent yield, was a viscous oil, boiling point 194-197 degrees (0.6 millimeter).

Preparation 19: 2-chloro-9-(4-chlorobutyn-2-yl) thiaxanthene

The lithium derivative of 2-chlorothiaxanthene was prepared and reacted with 1,4-dichlorobutyne-2 in the manner described for Preparation 5. The yield of material boiling at 195-204 degrees (0.9 millimeter) was 45 percent.

EXAMPLES

*Example 1:* 9-{3-[1-(3-hydroxypropyl)-4-piperazinyl] propyl} thiaxanthene dihydrochloride To a solution containing 5.2 grams (0.016 mole) of 9-(3-bromopropyl) thiaxanthene, 5 grams (0.035 mole) of 1-(3-hydroxypropyl) piperazine (prepared according to J. Am. Soc., 76, 1126 (1954), in 50 milliliters of toluene there was added 6.9 grams (0.05 mole) of anhydrous potassium carbonate, and the mixture was refluxed for 14 hours. Water was added, the layers were separated and the toluene layer was extracted with dilute hydrochloric acid. The acidic aqueous solution was made alkaline, extracted with ether and the ether solution was washed several times with water, dried and distilled to a solid residue weighing 4 grams. A 0.5 gram sample of this solid was recrystallized from 25 milliliters of heptane to yield 0.3 gram of 9-{3-[1-(3-hydroxypropyl)-4-piperazinyl]propyl} thiaxanthene, as a white solid, melting at 87-89 degrees centigrade.

*Analysis.*—Calculated for $C_{23}H_{30}N_2OS$: Neut. equiv., 383; N, 7.32. Found: Neut. equiv., 379; N, 7.39.

The dihydrochloride of 9-{3-[1-(3-hydroxypropyl)-4-piperazinyl]propyl}thiaxanthene was obtained by treating an ethanolic solution of 3.5 grams of the base with excess ethereal hydrogen chloride at room temperature. The solution remained clear for a moment then the dihydrochloride separated as a white solid which was filtered off and digested with hot methanol. Yield 2.2 grams, melting point 256–257 degrees (decomposition). The mother liquor and wash were concentrated to 20 milliliters and diluted with ether to obtain 1.7 grams of material of approximately the same purity. The dihydrochloride salt is a white, crystalline solid, readily soluble in water.

*Analysis.*—Calculated for $C_{23}H_{30}N_2OS$: N, 6.15; Cl⁻, 15.57. Found: N, 6.10; Cl⁻, 15.34.

*Example 2.—9-{2-[1-(2-hydroxyethyl)-4-piperazinyl] ethyl}thiaxanthene dihydrochloride*

Following the procedure of Example 1, 2.6 grams of 9-(2-bromoethyl)thiaxanthene was reacted with 2.5 grams of 1-(2-hydroxyethyl)-piperazine (J. Am. Chem. Soc., 76, 1126 [1954]). There was thus obtained the free base 9-{2-[1-(2-hydroxyethyl) - 4 - piperazinyl]ethyl}thiaxanthene, which was then converted to the dihydrochloride salt. After several recrystallizations from methanol-ether, there was obtained 3.5 grams of 9-{2-[1-(2-hydroxyethyl) 4-piperazinyl]ethyl}thiaxanthene dihydrochloride as a white, crystalline solid which melted at 263–264 degrees centigrade (dec.). An alternative nomenclature for this compound is 1-(beta-hydroxyethyl)-4-[beta-(9-thiaxanthenyl)ethyl]piperazine dihydrochloride.

*Analysis.*—Calculated for $C_{21}H_{26}N_2OS \cdot 2HCl$: N, 6.56; Cl⁻, 16.59. Found: N, 6.31; Cl⁻, 16.55.

*Example 3.—9-{5-[1-(3-hydroxypropyl)-4-piperazinyl] pentyl}thiaxanthene dihydrochloride*

A mixture of 3 grams (0.0087 mole) of 9-(5-bromopentyl)thiaxanthene, 4 grams (0.028 mole) of 1-(3-hydroxypropyl)piperazine (J. Am. Chem. Soc. 76, 1126 [1954]), 6 grams of anhydrous potassium carbonate and 50 milliliters of toluene was refluxed for 16 hours. Water was added, the layers were separated and the toluene solution was extracted with dilute hydrochloric acid. The aqueous extracts were made alkaline and extracted with ether. The dried ether solution was treated with an excess of ethereal hydrogen chloride to precipitate the dihydrochloride salt which was recrystallized from methanol-ether. Yield of 9-{5-[1-(3-hydroxypropyl)-4-piperazinyl]pentyl}thiaxanthene dihydrochloride was 2.3 grams, melting point 229–233 degrees centigrade. It is a white crystalline solid, readily soluble in water.

*Analysis.*—Calculated for $C_{25}H_{34}N_2OS \cdot 2HCl$: Cl⁻, 14.66. Found: Cl⁻, 14.79.

*Example 4.—2-chloro-9-{3-[1-(2-hydroxyethyl)-4-piperazinyl]propyl}thiaxanthene dihydrochloride*

A mixture of 6.4 grams (0.018 mole) of 2-chloro-9-(3-bromopropyl)thiaxanthene, 5 grams (0.038 mole) of 1-(2-hydroxyethyl)piperazine (J. Am. Chem. Soc., 76, 1126 [1954]), 8 grams of anhydrous-potassium carbonate and 65 milliliters of toluene was refluxed for 16 hours. Water was added, the layers were separated and the toluene layer was extracted with dilute hydrochloric acid. The acidic aqueous solution was made alkaline, extracted with ether and the ether solution was washed several times with water and dried. The addition of ethereal hydrogen chloride precipitated 5.2 grams (72 percent) of crude dihydrochloride as a white, crystalline solid which melted at 258–259 degrees centigrade (dec.) after several recrystallizations from ethanol-ether.

*Analysis.*—Calculated for $C_{22}H_{27}ClN_2OS \cdot 2HCl$: N, 5.89; Cl⁻, 14.90. Found: N, 5.85; Cl⁻, 14.70.

*Example 5.—2-chloro-9-{3-[1-(3-hydroxypropyl)-4-piperazinyl]propyl}thiaxanthene dihydrochloride*

A stirred mixture of 50 grams (0.16 mole) of 2-chloro-9-(3-chloropropyl)thiaxanthene, 35 grams (0.24 mole) of 1-(3-hydroxypropyl)piperazine, 75 grams of powdered anhydrous potassium carbonate and 250 milliliters of amyl alcohol was stirred under reflux for 16 hours. Approximately 200 milliliters of water was added to the cooled mixture in order to dissolve the inorganic salts. The layers were separated; the organic layer was washed with four, 50 milliliter portions of 5 percent sodium chloride solution, and acidified with 36 milliliters of concentrated hydrochloric acid. The solution was vacuum-distilled to dryness; the solid residue was dissolved in 95 percent methanol, and the solution was treated with decolorizing charcoal. Dilution with ether and cooling precipitated 58 grams (73 percent) of product, melting point 246–247 degrees centigrade (dec.). The melting point was raised to 247–248 (dec.) by subsequent recrystallization from the same solvent mixture.

*Analysis.*—Calculated for $C_{23}H_{29}ClN_2OS \cdot 2HCl$: N, 5.72; Cl⁻, 14.47. Found: N, 5.88; Cl⁻, 14.33.

*Example 6.—2-chloro-9-{4-[1-(2-hydroxyethyl)-4-piperazinyl]butyl}thiaxanthene dimaleate*

A mixture of 6.5 grams of 2-chloro-9-(4-chlorobutyl)thiaxanthene, 8 grams of 1-(2-hydroxyethyl)piperazine, 12 grams of anhydrous potassium carbonate and 100 milliliters of toluene was refluxed for 24 hours. Water was added, the layers were separated and the toluene layer was extracted with hydrochloric acid. The acidic aqueous solution was made basic and extracted with chloroform. The chloroform solution was washed with water, dried and distilled to an oil. The oil was dissolved in 70 milliliters of warm ethanol and combined with a solution of 15 grams of maleic acid in 70 milliliters of ethanol. The solution was treated with charcoal, filtered and cooled. The solid which separated weighed 2 grams and melted at 175–175.5 degrees centigrade after several recrystallizations from ethanol. The 2-chloro-9-{4-[1-(2-hydroxyethyl)-4-piperazinyl]butyl}thiaxanthene dimaleate thus prepared, is a white crystalline solid, soluble in water.

*Analysis.*—Calculated for $C_{31}H_{37}ClN_2O_9S$: N, 4.31. Found: N, 4.24.

*Example 7.—2-chloro-9-{2-[1-(2-hydroxyethyl)-4-piperazinyl]propyl}thiaxanthene dihydrochloride*

A solution of 6 grams (0.015 mole) of 2-chloro-9-(2-iodopropyl)thiaxanthene and 5.2 grams (0.04 mole) of 1-(2-hydroxyethyl)piperazine (J. Am. Chem. Soc., 76, 1126 [1954]) in 50 milliliters of toluene, to which 6 grams of anhydrous potassium carbonate had been added, was refluxed for 14 hours. Water was added, the toluene layer was extracted with dilute hydrochloric acid, and the aqueous solution was made alkaline. The liberated base was extracted with ether, the ether solution was washed several times with water and dried over anhydrous magnesium sulfate. There was thus obtained the free base 2-chloro-9-{2-[1-(2 - hydroxyethyl)-4-piperazinyl]propyl} thiaxanthene. Treatment of an ether solution of the free base with excess hydrogen chloride precipitated an oil which solidified, and the solid was recrystallized twice from ethanol-ether mixture. Yield of 2-chloro-9-{2-[1-(2 - hydroxyethyl)-4-piperazinyl]propyl}thiaxanthene dihydrochloride as a water-soluble, white, crystalline solid, 1.3 grams, melting point 254–256 degrees centigrade (dec.).

[The mixed melting point with the isomeric n-propyl compound of Example 1 showed a definite depression indicating that the addition of HI to the allyl compound of Preparation 7 proceeded normally to afford the isopropyl iodide derivative of Preparation 8.]

*Analysis*—Calculated for $C_{22}H_{27}ClN_2OS \cdot 2HCl$: N, 5.89; Cl⁻, 14.90. Found: N, 5.83; Cl⁻, 14.87.

Following the procedure of Example 7, but using 10-(2-iodopropyl) thiaxanthene, 9-{2-[1-(2-hydroxyethyl)-4-piperazinyl]propyl}thiaxanthene and its di-acid addition salt can be prepared.

Following the procedure of Example 7, but reacting 2-chloro-10-(4-iodopentyl) thiaxanthene with 1-(2-hydroxypropyl)piperazine, the free base 2-chloro-9-{4-[1-(3-hydroxypropyl)-4-piperazinyl]pentyl}thiaxanthene and its di-acid addition salt can be prepared.

*Example 8: 2-chloro-9-{3[1-(2,3-dihydroxypropyl)-4-piperazinyl]propyl}thiaxanthene dihydrochloride.*

A mixture of 3.5 grams (0.01 mole) of 2-chloro-9-(3-bromopropyl)thiaxanthene, 27 grams (0.017 mole) of 1-(2,3-dihydroxypropyl) piperazine, 6 grams of anhydrous potassium carbonate and 30 milliliters of ethanol was refluxed for 4 hours. The alcohol was removed by distillation and the residue was partitioned between water and ether. The ether solution was washed several times with water, dried and treated with an excess of ethereal hydrogen chloride. The oil which separated was dissolved in 25 milliliters of hot ethanol and allowed to cool, whereupon the dihydrochloride salt separated as a white crystalline solid weighing 1.5 grams. It melted at 216–220 degrees centigrade after a subsequent recrystallization from a mixture of methanol and ether. It is readily soluble in water.

*Analysis*—Calculated for $C_{23}H_{29}ClN_2O_2S \cdot 2Cl$: N, 5.54; Cl−, 14.02. Found: N, 5:53; Cl−, 14.01.

Following the procedure of Example 8, but reacting 9-(3-bromopropyl) thiaxanthene with 1-(2,3-dihydroxypropyl) piperazine, the free base 9-{3-[1-(2,3-dihydroxypropyl)-4-piperazinyl]propyl} thiaxanehene and its di-acid addition salts can be prepared.

Following the procedure of Example 8, but reacting 2-bromo-9-(3-bromopropyl)thiaxanthene with 1-(1,2-dihydroxyethyl) piperazine, to free base 2 - bromo - 9 - {3-[1-(1,2 - dihydroxyethyl) -4-piperazinyl]propyl} thiaxanthene and its di-acid addition salts can be prepared.

*Example 9: 2-methoxy-9-{3-[1(2-hydroxyethyl)-4-piperazinyl]propyl}thiaxanthene dihydrochloride.*

By interaction of 9-(3-bromopropyl)-2-methoxy thiaxanthene and commercial N-(2-hydroxyethyl) piperazine by the process described in Example 5 in the compound was obtained in 64 percent yield.

It is, when recrystallized from methanol-ether, a white, crystalline solid, readily soluble in water, whose melting point is 230–232 degrees centigrade (dec.).

*Analysis*—Calculated for $C_{23}H_{30}N_2O_2S \cdot 2HCl$: N, 5.94; Cl−, 15.04. Found: N, 5.81; Cl−, 14.98.

*Example 10: 2 - hydroxy-9-{3-[1-(2-hydroxyethyl)-4-piperazinyl]propyl}thiaxanthene dihydrochloride.*

A mixture of 4 grams of the crude 9-(3-bromopropyl)-2-hydroxythiaxanthene, 4 grams of N-(2-hydroxyethyl) piperazine, 6 grams of anhydrous potassium carbonate and 50 milliliters of toluene was refluxed for 3.5 hours. Water was added and the toluene-water mixture was decanted from the thick, oily insoluble material. This oil was dissolved in dilute hydrochloric acid, the solution was treated with decolorizing charcoal and made alkaline with sodium carbonate to reprecipitate the thick oil. The oil was converted into a solid by trituration under 30 milliliters of boiling ethanol, and the solid was isolated. Yield, 1.5 grams, melting point 233–234 degrees (dec.) after recrystallization from a mixture of dimethylformamide and ethanol. The analysis of this material corresponded to the free base. It is in the form of a pinkish white powder.

Treatment of the above free base with excess hydrogen chloride in an ethereal solution produced the dihydrochloride salt which, after it was recrystallized from a mixture of 95 percent ethanol and ether, was obtained as a water-soluble, pinkish-white crystalline solid having a melting point of 255–256 degrees centigrade (dec.).

*Analysis*—Calculated for $C_{22}H_{28}N_2O_2S \cdot 2HCl$: N, 6.13; Cl−, 15.50. Found: N, 6.01; Cl−, 15.15.

*Example 11: 2-chloro-9-{3-[1-(2-methoxyethyl)-4-piperazinyl]propyl}thiaxanthene dihydrochloride.*

Following the procedure described in Example 5, this compound was prepared in 51 percent yield by the interaction of 9-(3-bromopropyl)-2-chlorothiaxanthene and two equivalents of N-(2-methoxyethyl) piperazine, and, after recrystallization from methanol-ether, it was obtained as a water-soluble, white, crystalline solid, melting point 257–258 degrees centigrade (dec.).

*Analysis*—Calculated for $C_{23}H_{29}ClN_2O \cdot 2HCl$: N, 5.72; Cl−, 14.47. Found: N, 5.43; Cl−, 14.30.

Following the procedure of Example 5 but reacting 2-methoxy-9-(3-bromopropyl) thiaxanthene with N-(2-ethoxyethyl) piperazine, there will be obtained 2-methoxy-9{3 - [1 - (2 - ethoxyethyl)-4-piperazinyl]propyl}thiaxanthene dihydrochloride.

Following the procedure of Example 5 but reacting 9-(3-bromopropyl)thiaxanthene with N-(2-hydroxyethoxyethyl) piperazine, there will be obtained 9-{3-[1-(2-hydroxyethoxyethyl)-4-piperazinyl]propyl}thiaxanthene dihydrochloride.

*Example 12: 2-chloro-9{3-[1-(2-hydroxyethoxyethyl)-4-piperazinyl]propyl}thiaxanthene dihydrochloride.*

Following the procedure of Example 5, this compound was prepared in 65 percent yield by the interaction of 9-(3-bromopropyl)-2-chlorothiaxanthene and two equivalents of N-(2-hydroxyethoxyethyl) piperazine.

After recrystallization from ethanol, the water-soluble, white, crystalline solid melted at 220–221 degrees centigrade.

*Analysis*—Calculated for $C_{24}H_{31}ClN_2O_2S \cdot 2HCl$: N, 5.38. Found: N, 5.28.

*Example 13: 9{3[1-(3-hydroxypropyl)-4-piperazinyl]propyl}-2-methylthiaxanthene dihydrochloride.*

Following the procedure of Example 5, this compound was prepared by the interaction of 9-(3-bromopropyl) thiaxanthene and two equivalents of N-(3-hydroxypropyl) piperazine in a yield of 51 percent.

After recrystallization from 95 percent ethanol-water it was obtained as a water soluble, white, crystalline solid melting at 242–243 degrees centigrade (dec.).

*Analysis*—Calculated for $C_{24}H_{32}N_2OS \cdot 2HCl$: N, 5.97; Cl−, 15.10. Found: N, 5.98; Cl−, 15.12.

*Example 14: 2-chloro-9-{3-[1-(3-hydroxypropyl)-4-piperazinyl]-2-methyl propyl}thiaxanthene dihydrochloride.*

This compound was prepared, following the process of Example 5, by the interaction of 9-(3-chloro-2-methyl propyl)-2-chloro-thiaxanthene and two equivalents of commercial N-(2-hydroxyethyl) piperazine in refluxing toluene.

After recrystallization from ethanol-ether, it was obtained as a water-soluble, white, crystalline solid which melted at 226–229 degrees centigrade.

*Analysis*—Calculated for $C_{23}H_{29}ClN_2OS \cdot 2HCl$: N, 5.72; Cl−, 14.47. Found: N, 5.74; Cl−, 14.32.

*Example 15: 2-ethoxy-9-{3-[1-(3-hydroxypropyl)-4-piperazinyl]propyl}thiaxanthene dihydrochloride.*

Following the procedure of Example 5, this compound was prepared by the interaction of 9-(3-bromopropyl)-2-ethoxythiaxanthene and N-(2-hydroxypropyl)piperazine, and after recrystallization from ethanol, was obtained as a water-soluble, white, crystalline solid, which melted at 208–210 degrees centigrade.

*Analysis*—Calculated for $C_{25}H_{34}N_2O_2S \cdot 2HCl$: N, 5.61; Cl−, 14.20. Found: N, 5.55; Cl−, 13.72.

*Example 16: 2-chloro-9-{3-[1-(4-hydroxybutyl)-4-piperazinyl]propyl}thiazanthene dihydrochloride.*

Following the procedure of Example 5, this compound was prepared in 42 percent yield by the interaction of 9-(3-bromopropyl)-2-chlorothiaxanthene and N - (4-hydroxybutyl) piperazine.

After recrystallization from methanol-ether the compound was obtained in the form of water and alcohol-soluble, colorless crystals, which melted at 222–223 degrees centigrade (dec.).

Analysis.—Calculated for $C_{24}H_{31}ClN_2OS \cdot 2HCl$: N, 5.56; Cl⁻, 14.07. Found: N, 5.53; Cl⁻, 14.04.

It will be apparent from the foregoing examples how the various illustrated thiaxanthene-containing intermediates may be reacted with the various substituted-piperazine to form other compounds within the scope of the present invention.

The following examples will illustrate how other acid addition salts are formed from one another.

*Example 17: 2-chloro-9{3-[1-(3-hydroxypropyl)-4-piperazinyl]propyl}thiaxanthene bis-cyclo-hexylsulfamate.*

This compound was formed by taking the dihydrochloride product of Example 5, dissolving it in water, adjusting the pH to about 10 with aqueous sodium hydroxide, thereby liberating the free base and extracting the free base with ether. After the ether extract was washed and dried an excess of cyclohexylsulfamic acid was added. The bis-cyclohexylsulfamate salt which formed was recrystallized from ethanol-ether and obtained as colorless crystals which melted at 94–95 degrees centigrade. It was only slightly soluble in water (about 1 percent) but was soluble in alcohol.

Analysis.—Calculated for $C_{35}H_{55}ClN_4O_7S_3$: N, 7.23. Found: N, 7.22.

In the same manner, if instead of cyclohexylsulfamic acid, there was used hydrobromic acid, hydroiodic acid, nitric acid, phosphoric acid, sulfuric acid, acetic acid, citric acid, tartaric acid or lactic acid, the resultant acid addition salt would be the di-hydrobromide, di-hydroiodide, di-nitrate, di-phosphate or di-acid phosphate, di-sulfate or di-bisulfate, di-acetate, di-citrate or di-acid citrate, di-tartrate or di-bitartrate and di-lactate, respectively.

*Example 18: 2-chloro-9-{3-[1-(2-acetoxyethyl)-4-piperazinyl]propyl}-thiaxanthene dihydrochloride.*

Five milliliters of acetyl chloride was added slowly to a solution of 5 grams of the free base, 2-chloro-9{3-[1-(2-hydroxyethyl)-4-piperazinyl]propyl} - thiaxanthene, in 40 milliliters of toluene obtained from the dihydrochloride of Example 4 by the toluene extraction of an aqueous alkaline solution of that hydrochloride, and 5 grams of anhydrous potassium carbonate. The reaction was exothermic, and a precipitate formed immediately. The reaction mixture was refluxed for an additional two hours, cooled, poured into ice water, made strongly alkaline and extracted with ether. Treatment of the dried ether extract with anhydrous hydrogen chloride precipitated the dihydrochloride which was recrystallized by the careful addition of ether to its methyl alcohol solution. The yield of dihydrochloride obtained was 3.2 grams or 51 percent of the theoretical. The product melted at 227–228 degrees centigrade and analyzed:

Calculated for $C_{24}H_{29}ClN_2O_2S \cdot 2HCl$: N, 5.41; Cl⁻, 13.69. Found: N, 5.57; Cl⁻, 13.48.

*Example 19: 2-chloro-9-{3-[1-(3-acetoxypropyl)-4-piperazinyl]propyl}-thiaxanthene dihydrochloride.*

Five milliliters of acetyl chloride was added slowly to a solution of 5 grams of the free base, 2-chloro-9-{3-[1-(3-hydroxypropyl)-4-piperazinyl]propyl}thiaxanthene, in 40 milliliters of toluene obtained from the dihydrochloride of Example 5 by the toluene extraction of an aqueous alkaline solution of that hydrochloride, and 5 grams of anhydrous potassium carbonate. The reaction was exothermic and a precipitate formed immediately. The reaction mixture was refluxed for an additional two hours, cooled, poured into ice-water, made strongly alkaline and extracted with ether. Treatment of the dried ether extract with anhydrous hydrogen chloride precipitated the dihydrochloride which was recrystallized by the careful addition of ether to its methyl alcohol solution. The product melted at 226–227 degrees centigrade and analyzed:

Calculated for $C_{25}H_{31}ClN_2O_2S \cdot 2HCl$: N, 5.27; Cl⁻, 13.33. Found: N, 5.31; Cl⁻, 13.21.

*Example 20: 2-chloro-9-{3-[1-(3-propionoxypropyl)-4-piperazinyl]propyl}-thiaxanthene dihydrochloride.*

The general method of Example 19 was followed using propionyl chloride in place of acetyl chloride. The product dihydrochloride melted at 228–229 degrees centigrade and analyzed:

Calculated for $C_{26}H_{33}ClN_2O_2S \cdot 2HCl$: N, 5.13; Cl⁻, 12.99. Found: N, 4.91; Cl⁻, 12.44.

*Example 21: 2-chloro-9-{3-[1-(3-benzoyloxypropyl)-4-piperazinyl]-propyl}thiaxanthene dihydrochloride.*

The general method of Example 20 was followed using benzoyl chloride in place of propionyl chloride. The product dihydrochloride melted at 229–230 degrees centigrade and analyzed:

Calculated for $C_{30}H_{33}ClNO_2S \cdot 2HCl$: N, 4.72; Cl⁻, 11.94. Found: N, 4.49; Cl⁻, 11.48.

*Example 22: 2-chloro-9-{3-[1-(3-p-chlorobenzoyloxypropyl)-4-piperazinyl]propyl}thiaxanthene dihydrochloride.*

The general method of Example 21 was followed using p-chloro-benzoyl chloride in place of benzoyl chloride. The product dihydrochloride melted at 232–233 degrees centigrade and analyzed:

Calculated for $C_{30}H_{33}Cl_2N_2O_2S \cdot 2CHl$: N, 4.45; Cl⁻, 11.26. Found: N, 4.29; Cl⁻, 11.28.

*Example 23: 2-chloro-9-{3-[1-((3-(3,4,5-trimethoxy)benzoyloxypropyl)) - 4 - piperazinyl]propyl}thiaxanthene dihydrochloride.*

The general method of Example 21 was followed using 3,4,5-trimethoxy benzoyl chloride in place of benzoyl chloride. The product dihydrochloride melted at 236–237 degrees centigrade with decomposition and analyzed:

Calculated for $C_{33}H_{39}ClN_2O_5S \cdot 2HCl$: N, 4.72; Cl⁻, 11.94. Found: N, 4.49; Cl⁻, 11.48.

Following the procedure of Example 18, but reacting the free base, 9-{2 - [1 - (2-hydroxyethyl)-4-piperazinyl]ethyl}thiaxanthene, obtained from dihydrochloride of Example 2, with valeryl chloride, there will be obtained 9{2-[1-(2-valeroxyethyl) - 4 - piperazinyl]ethyl}thiaxanthene dihydrochloride.

Following the procedure of Example 18, but reacting the free base, 9{5-[1-(3-hydroxypropyl) - 4 - piperazinyl]pentyl}thiaxanthene, obtained the dihydrochloride of Example 3, with p-methyl benzoyl chloride, there will be obtained 9-{5-[1-(3 - p - methylbenzoyloxypropyl) - 4-piperazinyl]pentyl}thiaxanthene dihydrochloride.

Following the procedure of Example 18, but reacting the free base, 2-methoxy - 9 - {3 - [1-(2-hydroxyethyl)-4-piperazinyl]propyl}thiaxanthene, obtained from the dihydrochloride of Example 9, with p-bromo-benzoyl chloride, there will be obtained 2-methoxy-9-{3-[1-(2-p-bromobenzoyl oxyethyl) - 4 - piperazinyl]propyl}thiaxanthene dihydrochloride.

The di-acid addition compounds of the present invention have been tested by standard pharmacological tests, and have exhibited marked ataractic potency with a minimum of side effects. To illustrate the pharmacological effects of the invention compounds, the compounds of Examples 4 and 5 (hereinafter referred to as compounds 1 and 2, respectively, for brevity, and which are representative of the various compounds of the present invention) will be contrasted with the well-known ataractic drug, thorazine, as follows:

In studying the ataractic potency of compounds 1 and 2, they were first tested in the trained albino rat for inhibition of conditioned reflexes and in order to gain a quantitative measure of ataractic activity, thorazine (chlorpromazine) was used as a standard. On intraperitoneal administration into the albino rat, bath compounds 1 and 2 were approximately twice as effective as thorazine in inhibiting the conditioned reflexes.

In estimating the potency of inhibition of unconditioned reflexes, compounds 1 and 2 were studied on mice performance on the rotabar and a quantitative measure of potency was determined also by using thorazine as a standard. These studies indicated that compounds 1 and 2, and thorazine, were about equal in potency in their ability to inhibit unconditional reflexes in the experimental animal. However, compounds 1 and 2 exerted a more prolonged ataractic effect than thorazine.

Since thorazine is well-known to have the undesirable side effects of sedation and of potentiating the sedative action of barbiturates, compounds 1 and 2 were investigated for their sedative action. Neither compound 1 nor 2 exhibited sedation, nor were they observed to potentiate barbiturate sedation.

Compounds 1 and 2 were found effective in abolishing induced vomiting in dogs receiving morphine. Thus, in a series of experiments in which dogs received 10 milligrams per kilogram of morphine sulfate, 4 milligrams of each of compounds 1 and 2 protected three out of four and five out of six dogs, respectively, from vomiting.

The subject matter which the applicants regard as their invention is particularly pointed out and distinctly claimed as follows:

1. A compound having the formula

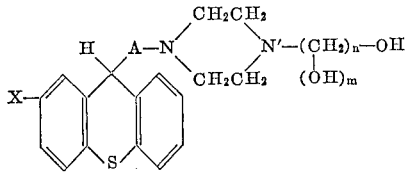

wherein X is selected from the group consisting of halo, hydroxy, lower-alkyl and lower alkoxy;
A is an alkylene bridge containing from 2 to 6 carbon atoms;
m is selected from the group consisting of zero and one; and
n is an integer from 2–4, inclusive.

2. A compound having the formula

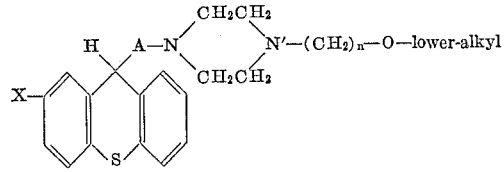

wherein X is selected from the group consisting of halo, hydroxy, lower-alkyl and lower alkoxy;
A is an alkylene bridge containing from 2 to 6 carbon atoms; and
n is an integer from 2–4, inclusive.

3. A compound having the formula

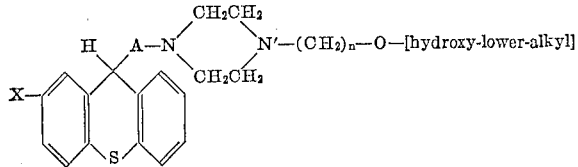

wherein X is selected from the group consisting of halo, hydroxy, lower-alkyl and lower alkoxy;
A is an alkylene bridge containing from 2 to 6 carbon atoms; and
n is an integer from 2–4, inclusive.

4. A compound having the formula

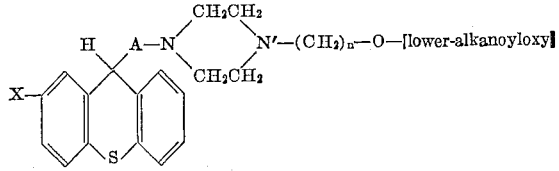

wherein X is selected from the group consisting of halo, hydroxy, lower-alkyl and lower alkoxy;
A is an alkylene bridge containing from 2 to 6 carbon atoms; and
n is an integer from 2–4, inclusive.

5. A compound having the formula

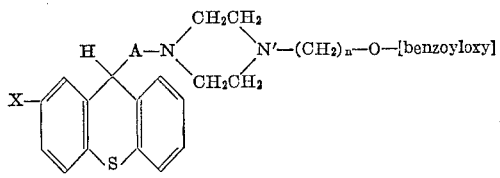

wherein X is selected from the group consisting of halo, hydroxy, lower-alkyl and lower alkoxy;
A is an alkylene bridge containing from 2 to 6 carbon atoms; and
n is an integer from 2–4, inclusive.

6. 2 - chloro - 9{3-[1-(2-hydroxyethyl)-4-piperazinyl]propyl}thiaxanthene dihydrochloride.

7. 2-chloro - 9{3-[1-(3-hydroxypropyl)-4-piperazinyl]propyl}thiaxanthene dihydrochloride.

8. 2-chloro-9{3-[1 - (2,3 - dihydroxypropyl) - 4 - piperazinyl]propyl}thiaxanthene dihydrochloride.

9. 2-methoxy-9-{3-[1-(2-hydroxyethyl)-4 - piperazinyl]propyl}thiaxanthene dihydrochloride.

10. 2-chloro-9-{3-[1-(2-methoxyethyl) - 4-piperazinyl]propyl}thiaxanthene dihydrochloride.

11. 2-chloro-9{3-[1,(2-hydroxyethoxyethyl) - 4-piperazinyl]propyl}thiaxanthene dihydrochloride.

12. {3-[1-(3-hydroxypropyl) - 4-piperazinyl[propyl}-2-methylthiaxanthene dihydrochloride.

References Cited by the Examiner

UNITED STATES PATENTS

| | | | |
|---|---|---|---|
| 2,676,971 | 4/1954 | Cusic et al. | 260—268 |
| 2,889,322 | 6/1959 | Jacob et al. | 260—243 |
| 2,940,969 | 6/1960 | Bonvicino et al. | 260—268 |
| 2,951,082 | 8/1960 | Sprague et al. | 260—268 |
| 2,975,175 | 3/1961 | Jacob et al. | 260—268 |
| 2,996,503 | 8/1961 | Sprague et al. | 260—268 |
| 3,047,580 | 7/1962 | Sprague | 260—268 |
| 3,116,291 | 12/1963 | Peterson et al. | 260—268 |
| 3,192,204 | 6/1965 | Craig et al. | 260—268 |

ALEX MAZEL, *Primary Examiner.*

IRVING MARCUS, NICHOLAS S. RIZZO, *Examiners.*

NORMAN H. STEPNO, JAMES W. ADAMS, JR.,
*Assistant Examiners.*